Aug. 5, 1924.
H. E. ALTGELT
PLOW
1,503,779
Filed April 25, 1923  3 Sheets-Sheet 3
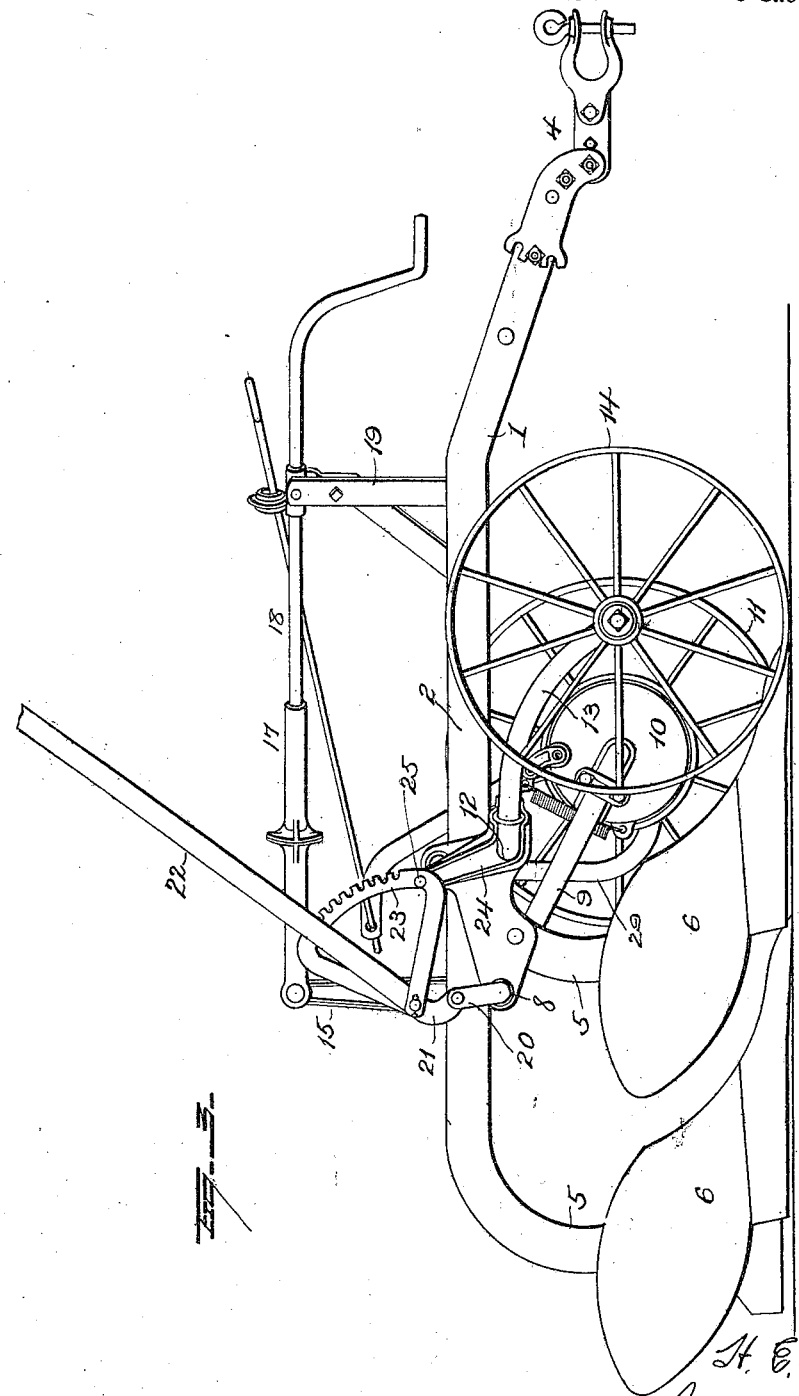
Inventor
H. E. Altgelt
By Seymour & Bright
Attorneys Patented Aug. 5, 1924.

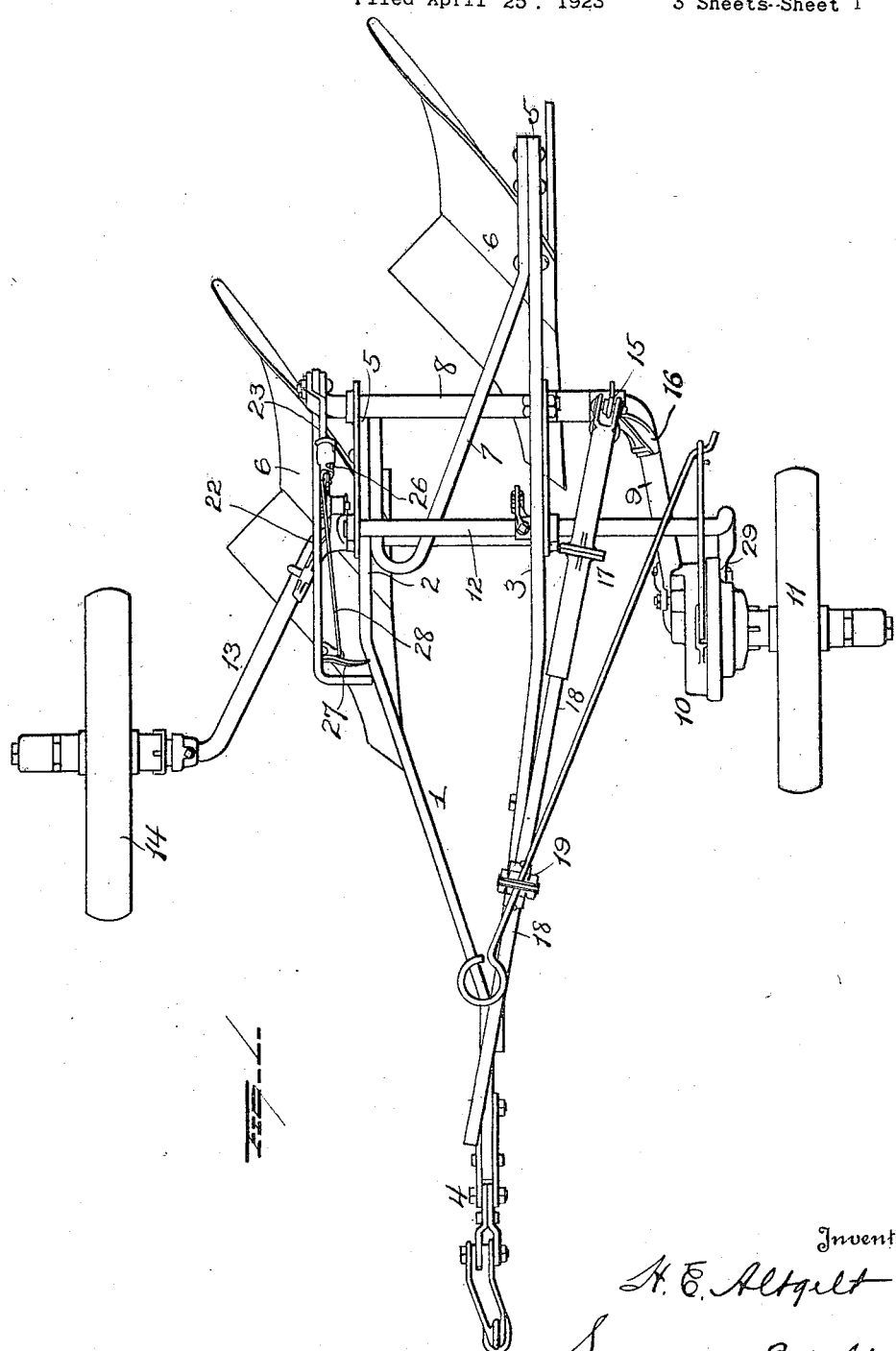

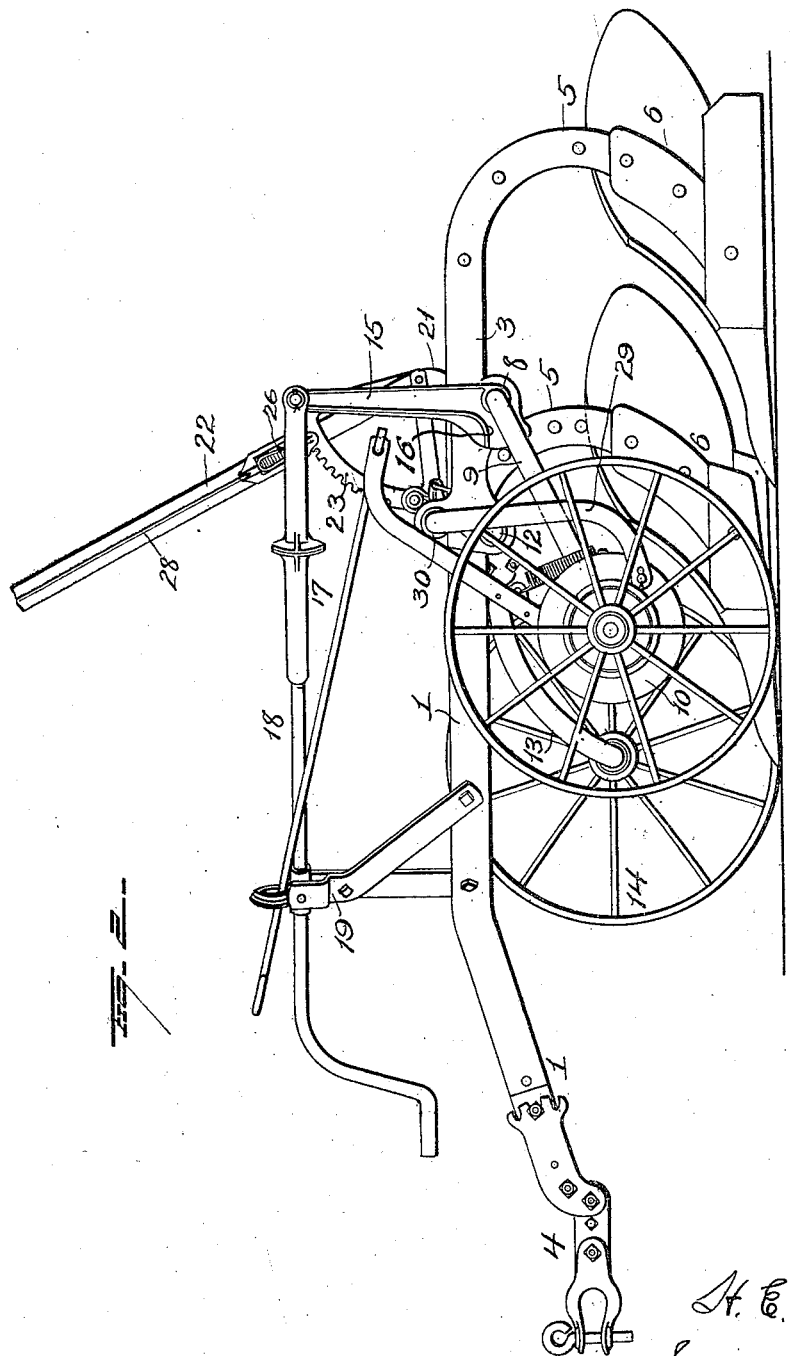

1,503,779

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

PLOW.

Application filed April 25, 1923. Serial No. 634,547.

*To all whom it may concern:*

Be it known that I, HERMAN E. ALTGELT, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to those of the power-lift type,—one object of the present invention being to provide improved and simplified depth-adjusting means.

A further object is to provide simple and efficient leveling means, which shall be so constructed and arranged that when the plow is being raised with the use of power-lift mechanism, the hand grip of the lever whereby the leveling means are controlled will remain practically in the same position relatively to the tractor seat as when the plow is at work and always be within convenient reach of the operator or tractor driver.

A further object is to so construct the furrow-wheel-axle that ample clearance for trash and weeds to pass under the axle will be afforded.

With these and other objects in view, the invention consists in certain novel features of construction and combination of parts as hereinafter set forth and pointed out in the claims.

In the accompanying drawings,—

Figure 1 is a plan view of a plow structure embodying my improvements.

Figure 2 is a side elevation of the plow taken from landside of the same, and

Figure 3 is a side elevation at the furrow side of the plow structure.

The frame 1 of the plow comprises beams 2—3 which converge at their forward ends and have connected therewith suitable coupling devices 4 for connecting the plow structure to the tractor. Rearwardly of the converging forward portion of the frame, the beams 2—3 are substantially parallel with each other (one projecting rearwardly beyond the rear end of the other) and the rear end of said beams are curved downwardly and form standards 5, to which plow bases 6 are secured. The spaced rear portions of the beams 2—3 are connected by a diagonal brace beam 7, the respective ends of which may be made to conform to the rear portions and standard members of the beams 2—3 and secured to the same.

A land wheel axle 8 is mounted in suitable bearings on the rear portion of the frame 1 so as to be located behind the front beam 2 and pass under the adjacent beam 3, and the spindle portion of its crank 9 is connected through the medium of clutch devices indicated at 10 with a land wheel 11. A furrow wheel axle 12 is mounted transversely on the frame 1 forwardly of the land wheel axle 8 and the spindle portion of this axle at the free end of the crank portion 13 is mounted in the hub of a furrow wheel 14. The crank portion 13 of this furrow wheel axle is curved or bowed upwardly as clearly shown in Figure 2 and also in Figure 3. This curving or upward bowing of the crank portion 13 of the furrow wheel axle permits ample clearance for the passage of the same over trash and weeds.

A lever 15 is mounted loosely near its lower end upon the land wheel axle 8 and is provided with a forwardly projecting stop arm 16, which latter is so disposed that it may be adjusted with relation to the crank 9 of said axle and thereby adjust the plow for depth of plowing. It is apparent that if the lever 15 be so adjusted that its stop arm 16 will be disposed relatively to the crank 9 as shown in Figure 2, the plow bases may enter the ground to an extent permitted by engagement of the stop arm with said crank and the depth of penetration of the plow bases may be accurately controlled by movement of the lever 15 so that the relation of the stop arm 16 to the crank 9 will be changed or adjusted.

For the purpose of operating the lever 15 to adjust its stop arm 16, a screw adjusting device 17 may be employed, one end of the same being connected with the lever 15 and the operating shaft 18 of said device having a mounting supported by a standard 19 at the forward portion of the plow structure. The specific construction of this screw adjusting mechanism forms no part of my present invention but is disclosed and covered in Patent No. 1,448,426 granted to Rudolph J. Altgelt March 13, 1923.

The devices now to be described are employed for leveling the plow:

The land wheel axle 8 is provided at one end with an upwardly projecting crank arm 20 and with this arm the lower forwardly bent end portion 21 of a hand lever 22 is pivotally connected. An approximately triangular toothed segment frame 23 is pivotally connected at its apex with the hand lever 22 approximately at the juncture of the lower end portion 21 with said lever. An arm 24 is secured to the furrow wheel axle and projects in an upward direction therefrom,—the upper end of this arm being pivotally connected as at 25 with the segmental frame 23 in proximity to the juncture of the toothed portion of said frame with the lower arm of the latter. It will of course be understood that the lever 22 is provided with a suitable detent 26 to cooperate with the toothed portion of the segment frame 23 and that a finger lever 27 is connected by a rod 28 with said detent for operating the same.

It will be seen that when the hand lever 22 is moved downwardly the distance between the pivotal connection of said lever with the crank arm 20 and the pivotal connection of the segment frame with the arm 24 on the furrow wheel axle will be increased, thus causing said axle to be turned in a manner to depress the furrow wheel 14 and thus level the plow in the event that the furrow side thereof was too low. It is evident that by moving the hand lever 22 upwardly, the action will be reversed to that above described and the furrow wheel will be raised to cause the lowering of the furrow side of the plow structure in the event that the same was too high.

With the construction and arrangement of leveling mechanism above described, the hand lever 22 will remain in substantially the same position during the raising of the plow with the use of power-lift mechanism, as the position which it assumes during the normal operation of the plow.

In the drawings, I have shown power-lift mechanism including the clutch-mechanism 10 and a lifting arm 29 connected with a member of said clutch-mechanism and depending from a shaft 30 mounted on the plow frame so that when said clutch member is operatively connected with the land wheel, motion will be imparted through the arm 29 and shaft 30 to the frame to raise the latter. If desired, however, other construction of power-lift mechanism may be employed.

By the location of the land axle behind the rear beam 2 and causing it to pass under the second beam in a power-lift plow, I am enabled to get the wheels of the plow as far back on the frame as possible in order to make them (the land and furrow wheels) support the weight of the plow bases to the greatest extent, and to keep the plow at an even depth in uneven ground.

Having fully described my invention what I claim as new and desire to secure by Letters-Patent, is:

1. In a plow structure, the combination with a frame, furrow and land wheels, and crank axles for the respective wheels, of arms on the respective axles, a lever pivoted to the arm on the land wheel axle, a toothed segment with which said lever is cooperable, said toothed segment pivotally connected with said lever and with the arm on the furrow wheel axle.

2. In a plow structure, the combination with a frame, furrow and land wheels, and crank axles for the respective wheels, of an arm on the land wheel axle, an arm on the furrow wheel axle, a lever having a bent end portion pivotally connected with the arm on the land wheel axle, a toothed segment frame pivotally connected to the said lever near the bent end portion thereof, means pivotally connecting said segment frame near the lower end of its toothed portion with the arm on the furrow wheel axle, and a detent carried by said lever for cooperation with the toothed portion of the segment frame.

3. In a plow structure, the combination with a frame, furrow and land wheels, and crank axles for the respective wheels, of a lever loosely mounted on the land wheel axle and provided with a forwardly projecting stop arm over the crank of said axle, and means for moving said lever to adjust said stop arm relatively to the crank of the land wheel axle to regulate the depth of plowing of the plow bases, the lever moving means being also operable to hold said lever and stop arm in adjusted position.

4. In a plow structure, the combination with a frame and land and furrow wheels, of a crank axle for the land wheel and a crank axle for the furrow wheel, the crank arm of said last mentioned crank axle being bowed upwardly.

In testimony whereof, I have signed this specification in the presence of two subscribing witnesses.

HERMAN E. ALTGELT.

Witnesses:
EMMA ULLERY,
JENNIE DAVIS.